United States Patent [19]

Dupoiron et al.

[11] Patent Number: 5,376,464
[45] Date of Patent: Dec. 27, 1994

[54] STAINLESS CLAD SHEET AND METHOD FOR PRODUCING SAID CLAD SHEET

[75] Inventors: Francois Dupoiron, Le Creusot; Daniel Jobard, Le Breuil, both of France

[73] Assignee: Creusot-Loire Industrie, Puteaux, France

[21] Appl. No.: 54,830

[22] Filed: Apr. 30, 1993

Related U.S. Application Data

[63] Continuation of Ser. No. 871,538, Apr. 21, 1992, abandoned.

[30] Foreign Application Priority Data

Apr. 22, 1991 [FR] France ................ 91 04937

[51] Int. Cl.$^5$ ............... B32B 15/18; C21D 7/02; C21D 7/14
[52] U.S. Cl. ................ 428/679; 428/683; 428/685; 148/534
[58] Field of Search ........ 428/679, 683, 685; 148/529, 530, 534

[56]                   References Cited
            U.S. PATENT DOCUMENTS

| | | | |
|---|---|---|---|
| 2,632,234 | 3/1953 | Fitz | 428/683 |
| 3,649,380 | 3/1972 | Tauschek | 428/679 |
| 4,144,380 | 3/1979 | Beltran et al. | 425/679 |
| 4,325,994 | 4/1982 | Kitashina et al. | 428/679 |
| 4,689,279 | 8/1987 | Hull et al. | 428/679 |
| 4,814,236 | 3/1989 | Qureshi et al. | 428/679 |
| 4,943,489 | 7/1990 | Kuhara et al. | 428/679 |
| 4,973,445 | 11/1990 | Singheiser | 428/679 |
| 5,019,459 | 5/1991 | Chou et al. | 428/679 |
| 5,120,614 | 6/1992 | Hibner et al. | 428/679 |

FOREIGN PATENT DOCUMENTS 0233437  8/1987  European Pat. Off. .

OTHER PUBLICATIONS

Metals Handbook, 9th Ed., vol. 3, "Stainless Steels, Tool Materials and Special Purpose Metals", American Society for Metals, 1980, pp. 5–11, 46–47.
Metals Handbook, 9th Ed., vol. 4, "Heat Treating", American Society for Metals, 1981, pp. 623–625, 647–649, 654–655.
Metals Handbook, 9th Ed., vol. 13, "Corrosion", American Society for Metals, 1987, pp. 548–550.
Revue de Metallurgie vol. 58, No. 12, Dec. 1961, pp. 1039–1048, Paris, France; P. Bastien: "Les Toles Inoxydables Plaquees".

*Primary Examiner*—John Zimmerman
*Attorney, Agent, or Firm*—Oblon, Spivak, McClelland, Maier & Neustadt

[57]                    ABSTRACT

The clad sheet comprises a first layer or cladding of an iron-base or nickel-base alloy including at least 11% chromium and at least 17% nickel and resisting corrosion by very corrosive mediums such as acids, and a second layer or base of austenitic stainless steel including at least 11% chromium and at the most 17% nickel resisting atmospheric corrosion. The clad sheets may be cold re-rolled down to a thickness of 2 mm.

19 Claims, No Drawings

STAINLESS CLAD SHEET AND METHOD FOR PRODUCING SAID CLAD SHEET

This application is a continuation of application Ser. No. 07/871,538, filed on Apr. 21, 1992, now abandoned.

BACKGROUND OF THE INVENTION

The invention relates to a clad sheet which is stainless on both sides and to a method for producing this clad sheet.

In many applications of steels or alloys in very corrosive mediums, such as acids, there are employed steels of the superaustenitic type or nickel-base alloys in the form of a sheet; this is the case in particular in the construction of cisterns or certain chimney flues.

The products employed contain a large amount of nickel and are very expensive. In order to reduce the cost, as it is not possible to excessively reduce the thickness for reasons relating to the properties required of the constructions realized with these sheets, one is led to the use of clad sheets. These sheets are obtained by providing a cladding of an alloy layer on a base of structural steel.

This technique presents several drawbacks:
  the outer side of the base of structural steel which is not stainless may be subjected to atmospheric corrosion or a corrosion due to leakages of corrosive products when the sheet is used for making a container enclosing corrosive products; the outer side may be painted, but this is a costly operation which does not perfectly protect the surface and requires maintenance,
  the heat treatments required to obtain good characteristics of resistance to corrosion for alloy cladding are often incompatible with the heat treatments required for the base to obtain good mechanical properties and in particular resilience,
  when hot rolling, the very different rheological properties between the base and the cladding lead to unevennesses in the cladding thickness, and in order to ensure a guaranteed minimum thickness of the cladding at every point an extra thickness of cladding must be used,
  it is not possible to cold roll a sheet having one side of alloy and the other of structural steel owing to the very different rheological behaviour of the two materials.

When sheets having a layer of stainless steel cladding on a base of structural steel are employed for making up welded constructions, there may occur when welding the sheets a contamination of the stainless steel by the carbon or other alloy elements of the structural steel (dilution phenomenon).

The MANNESMANN patent EP 0,233,437 proposes a solution to the technical problem of compatibility between the heat treatments of the cladding and the base which consists in employing an austenoferritic stainless steel base. But this solution does not resolve the problem posed by the large rheological differences between the base and the cladding in both the hot and cold states.

SUMMARY OF THE INVENTION

An object of the invention is to provide a clad sheet which has resistance to corrosion by very aggressive products, such as acids, on one side and is also resistant to corrosion on the other side, this sheet being very much cheaper than a solid alloy sheet, it being obtainable with a small cladding thickness and a good evenness in the cladding thickness while avoiding contamination by dilution. This clad sheet permits producing by cold rolling thin sheets having a good surface state.

The invention provides a stainless clad sheet having two superimposed metal layers bonded to each other comprising a first layer or cladding of an iron-base or nickel-base alloy having a face-centered cubic structure including at least 11% chromium and at least 17% nickel and resisting corrosion by very aggressive mediums such as acids, and a second layer or base of austenitic stainless steel comprising less than 5% ferrite including at least 11% chromium and at the most 17% nickel, resisting atmospheric corrosion.

The layer of austenitic stainless steel is also capable of resisting accidental splashes of very corrosive products such as acids.

The clad sheets according to the invention are obtained by one of the following methods: hot co-rolling, cladding by explosion, cladding by explosion followed by hot re-rolling; the clad sheets are subjected to a hyper-quenching treatment from a temperature of between 950° C. and 1,180° C.

After hot rolling, these sheets may be cold rolled.

The invention concerns metal sheets which, when they are merely hot rolled, have a thickness greater than or equal to about 4 mm, and which, when they are cold re-rolled, have a thickness which may drop to 2 mm and an excellent surface state.

DETAILED DESCRIPTION OF THE INVENTION

The invention will now be described in a more precise but non-limitative manner.

To produce clad sheets according to the invention, there is bonded by co-rolling, or by explosion, or by explosion and re-rolling, in accordance with the known techniques, a first alloy plate having a very good resistance to severe corrosion, to a second plate of austenitic stainless steel, termed the "base" so as to constitute the "cladding".

These clad sheets are subjected to the heat treatments and finishing operations known to those skilled in the art; in particular a hyper-quenching is carried out from a temperature of between 950° C. and 1,180° C.; this hyper-quenching is necessary in Order to impart to the two layers their corrosion-resistant properties. Clad sheets are in this way obtained which have a thickness exceeding 5 mm of which thickness about ⅓ corresponds to the cladding and ⅔ to the base.

In the sheet of the invention, the cladding is either a nickel-base alloy or a superaustenitic steel. In both cases, the chromium content exceeds 11% and the nickel content exceeds 17% to ensure the stainless property and in particular the resistance to very aggressive mediums.

These alloys or steels are very expensive.

The base consists of an austenitic stainless steel containing at least 11% chromium to ensure a good resistance to atmospheric corrosion or accidental splashes of corrosive products, and at the most 17% nickel. The composition of this steel is so chosen as to have an austenitic structure the ferrite content of which is less than 5% so that the hot and cold rheological properties of the cladding and the base are as close as possible.

The nickel is in an amount which is just sufficient to impart an austenitic structure to the base. These steels are much cheaper than the superaustenitic alloys or steels for producing the cladding.

Austenitic stainless steels having high manganese or nitrogen contents with high mechanical properties may also be employed, for example steels containing 17 to 20% chromium, 8 to 11% nickel, 2 to 9% manganese and 0.12 to 0.5% nitrogen.

One skilled in the art knows how to choose the composition of the base so that its heat treatment is compatible with that of the cladding.

There is obtained in this way a clad metal sheet having, owing to its thickness, the required mechanical properties for the use to which this sheet may be put, a very good stainless quality on one side (that corresponding to the cladding), and a stainless quality, at least as concerns atmospheric aggressions and accidental splashes of very corrosive products, on the other side (that corresponding to the base); lastly, this sheet is much cheaper than a solid alloy sheet having the same mechanical performance.

One of the advantages of the clad sheet of the invention which distinguishes it from conventional clad sheets (on a base of structural steel) is due to the fact that both the base and the cladding have an austenitic structure and closely similar mechanical properties, so that their behaviors during a cold or hot rolling are closely similar. Consequently, the evenness of the thickness of the cladding is good because its rheological properties are close to those of the base. Further, it is possible to obtain a relatively thin cladding layer (of the order of 2 mm) on the base with no risk of contamination by dilution of the cladding by the elements of the steel of the base. Consequently, the sheets obtained by hot rolling may be re-rolled cold to produce clad sheets whose thickness may descend to 2 mm. In this case, the cold rolling is usually carried out in Such manner that the thickness of the cladding does not descend below 1 mm. Indeed, with thicknesses less than 1 mm, any scratching or mechanical aggression might damage the cladding in the region of this aggression so that it would no longer perform its function of providing a protection against severe corrosion.

Further, the clad sheet of the invention is much more shock-resistant than all previously known clad sheets made of stainless steels. This characteristic of the invention clad sheet is imparted to articles made therefrom and is very important in situations where articles are exposed to impact (for example when the clad sheets are used to make tanks for tank trucks or any generally mobile or transportable tank or vessel). It is believed that this improved shock resistance is due to the similar mechanical behavior of both layers constituting the invention clad sheet which avoids the formation of cracks. In the stainless clad sheets of the prior art, cracks and fractures are often observed when submitted to impact.

Another advantage of the invention resides in the use of a material for the base which has a very low carbon content and includes the alloy elements Cr and Ni. This composition reduces the dilution phenomena and consequently improves the behavoir of the sheet when welding.

The thinness of the cold re-rolled sheets also has the advantage of achieving a saving in weight and cost, which is of particular interest when these sheets are intended for making tanks transporting very aggressive products, such as acids, the saving in weight reducing the transported dead load.

Lastly, producing clad sheets by cold rolling provides the surface states associated with this method.

As non-limitative examples, the following may be employed for the cladding:

if the most aggressive medium is hydrofluoric acid, a nickel-base alloy of composition:
$Cr=22\%, Mo=7\%, W=1.5\%, Fe=19\%$
$C \leqq 0.015\%$;

if the most aggressive medium is sulphuric acid, a nickel-base alloy of composition:

$Cr=16\%, Mo=16\%, W=4\%, Fe=5\%, C \leqq 0.02\%$;

if the most aggressive medium is phosphoric acid, with the presence of chlorides, a superaustenitic steel of composition:

$Cr=25\%, Ni=25\%, Mo=5\%$;

if the most aggressive medium is ferric chloride, a nickel-base alloy of composition:

$Cr=16\%, Mo=13\%, W=3\%, C \leqq 0.015\%$.

Generally, there is employed for the cladding an alloy having a high corrosion resistance and a centred-face cubic structure such as an iron-base or nickel-base alloy containing at least 11% chromium and 17% nickel and optionally molybdenum in a proportion by weight higher than 1% and tungsten in a proportion higher than 0.5%.

These alloys may also include nitrogen, cobalt, niobium or copper.

Alloys comprising a high molybdenum content, for example of the order of 28%, may advantageously be employed. As concerns the base, if the least aggressive medium is an industrial atmosphere, there may be employed an austenitic stainless steel of the type 18-8 which has a ferrite content lower than 5% and contains in particular:

17 to 20% Cr, 8 to 11% Ni with optional additions of 0.12 to 0.5% nitrogen or 2 to 9% manganese, or a steel containing in particular:

Cr (16 to 18%), Ni (10 to 14%), Mo (2 to 4%) with optional additions of nitrogen (0.12 to 0.5%), or steels containing in particular:

Cr (20 to 24%), Ni (14 to 17%), Mo (2 to 4.5%) and additions of nitrogen (0.12 to 0.5%) and manganese (2 to 6%) with for example the following analysis:

| Cr | Ni | Mn | Mo | N | C | Si | Nb | P | S |
|---|---|---|---|---|---|---|---|---|---|
| 23 | 15 | 5.5 | 2.8 | 0.4 | <0.03 | <0.4 | <0.2 | <0.03 | <0.01. |

In every case, the composition of the base adjusted to impart thereto a structure having less than 5% ferrite and hot and cold rheological properties which are as close as possible to those of the cladding.

These steels may be low carbon steels (C<0.03%), or very low carbon steels (C<0.015%), and optionally include nitrogen additions.

Which amounts to choosing for the bases steels from among the types 304L, 316L, 317L or 304LN, 316LN, 317LN, XM 18, XM 19 according to the American AISI standards, or equivalent steels, as long as their structural equilibrium imparts thereto less than 5% ferrite.

Lastly, the steels may contain additions of copper (0.5 to 3%) or tungsten (0.5 to 2%).

There are very many possible combinations and one skilled in the art will know how to choose that which is the best adapted to each particular application.

What is claimed is:

1. A stainless clad sheet comprising two superimposed metal layers constituted by metal plates bonded to each other by co-deformation, namely a first layer constituting a cladding of a thickness of at least 1 mm of an alloy selected from the group consisting of an iron-base alloy and a nickel-base alloy having a face-centered cubic structure including at least 11% chromium and at least 17% nickel and resisting corrosion by very corrosive mediums and a second layer constituting a base of austenitic stainless steel comprising at least 11% chromium and at the most 17% nickel and resisting atmospheric corrosion, the structure of which stainless steel comprises less than 5% ferrite.

2. A clad sheet according to claim 1, wherein said base has a carbon content lower than 0.03%.

3. A clad sheet according to claim 1, wherein said alloy of said cladding layer includes at least one of the elements molybdenum and tungsten in a proportion by weight higher than 1% as concerns the molybdenum and higher than 0.5% as concerns the tungsten.

4. A clad sheet according to claim 1, wherein said alloy of said cladding layer further includes at least one of the elements nitrogen, cobalt, niobium and copper.

5. A clad sheet according to claim 1, wherein said steel of said base includes 17 to 20% chromium, 8 to 11% nickel.

6. A clad sheet according to claim 5, wherein said steel of said base includes 2 to 9% manganese and 0.12 to 0.5% nitrogen.

7. A clad sheet according to claim 5, wherein said steel of said base includes 2 to 9% manganese.

8. A clad sheet according to claim 5, wherein said steel of said base includes 0.12 to 0.5% nitrogen.

9. A clad sheet according to claim 1, wherein said steel of said base includes, in addition to said chromium and said nickel, molybdenum, nitrogen and manganese.

10. A clad sheet according to claim 1, wherein said sheet has a thickness of at least 4 mm.

11. A clad sheet according to claim 1, wherein said sheet has a thickness of 2 to 4 mm.

12. A clad sheet according to claim 11, wherein said first layer has a thickness of at least 1 mm.

13. A wall of a container for enclosing corrosive products comprising a clad sheet according to claim 1.

14. A chimney flue for corrosive exhaust products made of a clad sheet according to claim 1.

15. A tank for transporting aggressive products made of a clad sheet according to claim 1.

16. A method for producing a stainless clad sheet comprising two superimposed metal layers bonded to each other, namely a first layer constituting a cladding of an alloy selected from the group consisting of an iron-base alloy and a nickel-base alloy having a face-centered cubic structure including at least 11% chromium and at least 17% nickel and resisting corrosion by very corrosive mediums, and a second layer constituting a base of austenitic stainless steel comprising at least 11% chromium and at the most 17% nickel and resisting atmospheric corrosion, the structure of which stainless steel comprises less than 5% ferrite, said clad sheet having a thickness of at least 4 mm, said method comprising:
  producing a cladding of a first metal plate having the composition of the first layer on a second metal plate having the composition of the second layer by co-deformation of said first and Second metal plates,
  and subjecting said clad sheet to a hyper-quenching treatment from a temperature of between 950° and 1,180° C.

17. A stainless clad sheet produced by the method of claim 16.

18. A method for producing a stainless clad sheet comprising two superimposed metal layers bonded to each other, namely a first layer constituting a cladding of an alloy selected from the group consisting of an iron-base alloy and a nickel-base alloy having a face-centered cubic structure including at least 11% chromium and at least 17% nickel and resisting corrosion by very corrosive mediums, and a second layer constituting a base of austenitic stainless steel comprising at least 11% chromium and at the most 17% nickel and resisting atmospheric corrosion, the structure of which stainless steel comprises less than 5% ferrite, said clad sheet having a thickness of 2 to 4 mm, said method comprising:
  producing a cladding of a first metal plate having the composition of the first layer on a second metal plate having the composition of the second layer by co-deformation of said first and second metal plates,
  subjecting said clad sheet to a hyper-quenching treatment from a temperature of between 950° and 1,180° C.
  and cold rolling said clad sheet down to a thickness of 2 to 4 mm, said first cladding layer having a thickness of at least 1 mm.

19. A stainless clad sheet produced by the method of claim 18.

* * * * *